United States Patent
Maruyama et al.

(10) Patent No.: US 7,595,013 B2
(45) Date of Patent: Sep. 29, 2009

(54) INJECTION MOLDING MACHINE, AND METHOD FOR ADJUSTING A REVERSE ROTATION AMOUNT OF A REVERSE ROTATION PROCESS IN AN INJECTION MOLDING MACHINE

(75) Inventors: Junpei Maruyama, Yamanashi (JP); Satoshi Takatsugi, Yamanashi (JP); Tatsuhiro Uchiyama, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 9 days.

(21) Appl. No.: 11/963,975

(22) Filed: Dec. 24, 2007

(65) Prior Publication Data

US 2009/0026646 A1    Jan. 29, 2009

(30) Foreign Application Priority Data

Jul. 23, 2007    (JP)    ............... 2007-191093

(51) Int. Cl.
B29C 45/52    (2006.01)

(52) U.S. Cl. ............... 264/40.1; 264/328.1; 425/145; 425/587

(58) Field of Classification Search ............... 264/40.1, 264/40.5, 40.7, 328.1; 425/145–148, 136, 425/587
See application file for complete search history.

(56) References Cited

U.S. PATENT DOCUMENTS

| 7,074,028 B2 | 7/2006 | Watanabe et al. |
| 2004/0142056 A1 | 7/2004 | Watanabe et al. |
| 2006/0278014 A1 * | 12/2006 | Okada et al. ............... 73/824 |

2008/0152748 A1    6/2008    Takatsugi et al.

FOREIGN PATENT DOCUMENTS

| DE | 19834086 C1 | 1/2000 |
| EP | 1439047 A1 | 7/2004 |
| EP | 1935608 A2 | 6/2008 |

(Continued)

OTHER PUBLICATIONS

EP Search Report for 08100175.2 dated Nov. 26, 2008.

*Primary Examiner*—Jill L Heitbrink
(74) *Attorney, Agent, or Firm*—Lowe, Hauptman, Ham & Berner, LLP

(57) ABSTRACT

When a resin passage of a check ring is opened, resin backflow occurs during time when an injection screw is moved forward, and a reverse rotational force is applied to the screw by resin backflow. On the other hand, when the resin passage is closed, there is no resin backflow and the reverse rotational force applied to the screw is greatly reduced. Consequently, after completion of metering process and before injection process, the screw is moved forward after the screw has been rotated in reverse a predetermined amount to prevent resin backflow. At this time, a maximum value of the reverse rotational force applied to the screw is detected. Until the detected maximum reverse rotational force reaches a reference value or less, the reverse rotation amount is increased sequentially and respective molding cycles are carried out. When the detected maximum reverse rotational force reaches the reference value or less (passage closure), the reverse rotation amount at this time is set as the reverse rotation amount for the reverse rotation process. By means of this operation, an optimal reverse rotation amount can be adjusted automatically.

12 Claims, 3 Drawing Sheets

FOREIGN PATENT DOCUMENTS

| | | |
|---|---|---|
| JP | 478380 B | 3/1972 |
| JP | 60-201921 A | 10/1985 |
| JP | 62-019423 A | 1/1987 |
| JP | 03-045325 A | 2/1991 |
| JP | 04-071817 A | 3/1992 |
| JP | 04284221 A | 10/1992 |
| JP | 09-174629 A | 7/1997 |
| JP | 2004-216808 A | 8/2004 |

* cited by examiner

INJECTION MOLDING MACHINE, AND METHOD FOR ADJUSTING A REVERSE ROTATION AMOUNT OF A REVERSE ROTATION PROCESS IN AN INJECTION MOLDING MACHINE

RELATED APPLICATIONS

The present application is based on, and claims priority from, Japanese Application Number 2007-191093, filed Jul. 23, 2007, the disclosure of which is hereby incorporated by reference herein in its entirety.

BACKGROUND OF THE INVENTION

1. Field of the Invention

The present invention relates to adjusting a reverse rotation amount of a reverse rotation process in an injection molding machine having a check ring on the end of an injection screw, which is closed by reverse rotation of the screw.

2. Description of the Related Art

Heretofore, an injection molding machine having an injection mechanism, such as an in-line screw injection molding machine, has been known, which is equipped with a check ring mechanism on the end of a screw, for preventing backflow of a resin during injection thereof. In such a check ring mechanism, a mechanism is generally utilized in which a resin flow passage is closed and opened by means of a resin pressure difference that occurs in front of and behind the check ring.

A resin pellet, which is supplied to the inside of a cylinder from behind the screw, is melted by shear heat generated upon rotation of the screw, and by heat from a heater disposed on an exterior side of a cylinder into which the screw is inserted. The molten resin causes the resin pressure to rise behind the check ring, thereby generating a force that presses the check ring forward. When the check ring is pressed forward, the resin therebehind passes through a gap between the check ring and a reduced diameter portion, and flows in front of the check ring, thereby raising the pressure in the cylinder in front of the screw head.

When the pressure in front of the check ring exceeds a predetermined pressure (back pressure), the screw is pressed backward and the pressure in front of the check ring is reduced in pressure. Further, by rotating the screw, since the pressure behind the check ring becomes greater than the pressure in front of the check ring, the molten resin continues to be fed to the front of the check ring, and as a result, when the screw is retracted a predetermined amount, rotation of the screw is halted.

Next, an injection process is initiated. In order for the resin to be filled, the screw is advanced, and because the pressure of the resin collected in front of the screw head is raised, the check ring is retracted and comes into intimate contact with a check seat, thereby closing the resin passage, and a metered amount of resin is injected into and fills the interior of a mold. After initiation of injection, during the interval from the start of injection process and retraction of the check ring up to closing of the resin passage, the resin passage is kept open, and backflow of the resin occurs. Because of this fact, the timing for closing the resin passage fluctuates and the amount of resin to be filled also fluctuates, such that the molding process becomes unstable.

Consequently, as a method for performing injection while preventing backflow of the resin at the time of injection, a method is known in which a check ring is used, which closes the resin passage by rotating the screw in reverse (rotation in a direction reverse to the direction of screw rotation during the metering process). After completion of measuring and before injection is initiated, the screw is rotated in reverse to close the resin passage of the check ring. Thereafter, the screw is advanced and injection is performed.

For example, with the technique according to the check ring disclosed in Japanese Patent Application Laid-Open No. 3-45325 (Patent Document 1), a push metal is fixedly attached to the screw, and a first resin passage is formed by a groove provided in the axial direction in the push metal. Further, a check ring is attached in a non-fixed condition to the screw, and a second resin passage is formed by a groove provided in the axial direction in the check ring. A pin provided in the screw head engages with a circumferential groove of a fixed length, which is disposed in the check ring. Consequently, when the screw is rotated in a positive direction (the rotation direction of the screw during metering is designated as positive rotation), the push metal also rotates positively, and as a result, by engagement of the pin and the groove, the check ring is moved relatively with respect to the push metal by the length of the groove formed in the push metal, whereby the first resin flow passage and the second resin flow passage are brought into communication with each other. Thereafter, the communicative state of the resin flow passages is maintained by engagement of the pin with the end of the groove, and the check ring is rotated together with the screw. In addition, when the screw is rotated in reverse, by engagement of the pin and the groove, the check ring is moved relatively by the length of the groove with respect to the push metal, and as a result, the first resin flow passage and the second resin flow passage are not communicated with each other and they are sealed.

Further, with the technique according to the check ring disclosed in Japanese Patent Application Laid-Open No. 4-71817 (Patent Document 2), resin passages are closed by causing reverse rotation of a screw, which is roughly the same as that disclosed in Patent Document 1. A check ring is fitted rotatably onto a small diameter part of the screw end. Holes defining molten resin passages are formed in the axial direction in the check ring. Further, recesses are formed at the end of the screw main body and at the rear end of the screw head. A projection disposed on the check ring engages with a fixed length peripheral groove provided on a shaft on which the screw head is assembled, whereby the check ring is mounted onto the screw. Consequently, when the screw is rotated positively, through engagement of the projection and the groove, the check ring is moved relatively with respect to the screw by the length of the groove, and thereafter the check ring rotates integrally with the screw. By means of such relative movement, the molten resin passages of the check ring and the recesses at the rear end of the screw head are brought into positional agreement, and resin passages are formed that communicate the front portion with the rear portion of the check ring. In addition, by rotating the screw in reverse, the check ring is moved relatively with respect to the screw by the length of the groove through engagement of the projection and the groove, so that the resin passages of the check ring are made to face the portions other than the recesses at the end of the screw main body and the rear end of the screw head, thereby closing the resin passages.

Further, with the technique according to the check ring disclosed in Japanese Patent Application Laid-Open No. 9-174629 (Patent Document 3), a check ring is disclosed in which, by positively rotating a screw that is roughly the same as those disclosed in Patent Documents 1 and 2, a ring is caused to rotate so that a resin passage is opened. Further, by rotating the screw in reverse, the resin passage is closed.

Furthermore, with the technique according to the check ring disclosed in Japanese Examined Patent Publication No. 47-8380 (Patent Document 4), an annular body is fitted rotatably between a screw head and the end of a screw shaft. An inclined surface is formed on the rear end surface of the screw head, and another inclined surface that contacts the inclined surface of the screw head is formed on the annular body. During metering, by positively rotating the screw, a resin passage is opened between the annular body and the screw shaft, such that front and rear portions of the annular body are communicated with each other. When the screw is rotated in reverse, the annular body is moved in an axial direction by the inclined surfaces of the screw head and the annular body. As a result, a valve contact face at the rear end of the annular body and a contact face at an end of the screw shaft are joined, whereby the resin passage is closed.

Further, in the techniques according to the check rings disclosed in Japanese Patent Application Laid-Open No. 60-201921 (Patent Document 5) and Japanese Patent Application Laid-Open No. 62-19423 (Patent Document 6), an inclined surface is formed on the rear end surface of a screw head so that it is engaged by a projection of a check ring. When the screw is rotated in reverse, the check ring is pressed by the inclined surface of the screw head, and as a result, the check ring is retracted and the resin passage is closed.

If the screw is advanced and injection is performed while the check ring is not closed and the resin passage is in an open state, a backflow of the resin is generated. Although a reverse rotational torque is imposed on the screw by the resin backflow, it is known that the reverse rotational torque stops acting on the screw when the check ring is closed during forward movement of the screw. For example, in Japanese Patent Application Laid-Open No. 2004-216808 (Patent Document 7), when the screw is made rotatable and injection is initiated, at first, the screw is rotated in reverse by backflow of the resin, however, when the check ring is closed, the reverse rotational torque stops acting on the screw and reverse rotation of the screw is halted. Consequently, closing of the check ring is detected by detecting the stoppage of the reverse rotation of the screw.

Compared with the case of a check ring in which the resin passage is closed as a result of a difference in resin pressure occurring in front of and behind the check ring at the time the screw is advanced, in the case of a check ring in which the resin passage is closed by rotating the screw in a direction opposite to the rotation direction at the time of metering, the resin passage can be closed more reliably. Also, because resin backflow generated at the time of injection is prevented, the amount of resin that fills the mold is made uniform and stable molding is enabled.

For this reason, when a check ring which closes the resin passage by rotating the screw in reverse is used, it is desirable to obtain an appropriate reverse rotation amount of the screw that closes the resin passage.

When the screw is rotated in reverse, although the screw head is rotated in reverse at the same speed as the screw, at this time, due to an effect of resin viscosity, the check ring also tends to rotate in reverse at a speed together with the screw head. As a result thereof, when the screw is rotated in reverse at a predetermined amount, the amount at which the check ring is rotated with respect to the screw head becomes smaller than the reverse rotation amount of the screw. Accordingly, when the screw is rotated in reverse for closing the flow passage, a screw reverse rotation amount is required, which is larger than the reverse rotation amount obtained from the design value of the check ring closing mechanism.

However, because the relative speed at which the check ring rotates with respect to the screw head fluctuates based on the viscosity of the resin and the like, the reverse rotation amount required for closing also varies according to the viscosity of the resin. For this reason, when the resin or other design conditions are changed, the reverse rotation amount, which is required for closing the resin passage, also changes.

With the check rings disclosed in Patent Documents 1 to 3, the resin passage is closed solely by reverse rotation of the screw. Accordingly, when the screw is rotated in reverse prior to start of injection and thereafter the injection process is carried out, in the event that the reverse rotation amount was insufficient, the resin passage remains open, and therefore, resin backflow occurs during injection, which is undesirable. On the other hand, in the case where the reverse rotation amount is excessive, although the resin passage is closed, the resin flows backward behind the screw more than necessary during reverse rotation, resulting in inconveniences such as an increase in metering time and long resin residing time.

On the other hand, with the check rings disclosed in Patent Documents 4 to 6, the resin passage can be closed by reverse rotation of the screw, and even in the case where the screw rotation amount is insufficient and the resin passage is not closed, the check ring can be caused to retract even by the resin pressure at the time of injection so as to close the resin passage. However, in the case where a step of rotating the screw in reverse to close the resin passage before start of the injection process is carried out as one step of the molding process, it is preferable for the resin passage to be reliably closed by reverse rotation of the screw. In addition, as described above, the screw reverse rotation amount for closing the resin passage of the check ring fluctuates due to the viscosity of the resin and the like. Therefore, it is desirable to determine a reverse rotation amount required for closing the resin passage, for reliably closing the resin passage in spite of fluctuations in viscosity or the like, and moreover, for suppressing an increase in the cycle time and minimizes residing time of resin.

In the conventional art, when using a check ring for closing a resin passage by reverse rotation of the screw, the fact that the amount of reverse rotation of the screw required for closing the resin passage varies according to molding conditions is disregarded, and a method for determining an optimal reverse rotation amount which is suitable to the molding condition concerned has not been known yet.

SUMMARY OF THE INVENTION

Accordingly, an object of the present invention is to provide an injection molding machine, which can determine an optimal reverse rotation amount of a screw, in an injection molding machine that utilizes a check ring for closing a resin passage by reverse rotation of the screw.

The injection molding machine according to the present invention comprises: an injection screw having a check ring thereon for closing a resin passage by reverse rotating the screw in a direction reverse to rotation of the screw during metering; rotary driving means for rotationally driving the screw; axial driving means for driving the screw in an axial direction of the screw; and rotational force detecting means for detecting a rotational force acting on the screw, and carries out a reverse rotation process in which, during an interval after completion of a metering process until start of an injection process, the screw is caused to rotate in a direction opposite to that during metering process.

In a first embodiment of the injection molding machine according to the present invention, the injection molding machine further comprises: determination means for determining whether or not the resin passage is closed by the check ring based on a reverse rotational force applied to the screw which is detected by the rotational force detecting means during forward movement of the screw; reverse rotation amount adjusting means which increases a reversed rotation amount of the screw for each molding cycle until the determination means determines that the resin passage is closed; and reverse rotation amount determining means for setting a reverse rotation amount of the screw, at a time when closure of the resin passage is determined by the determination means, as the reverse rotation amount for the reverse rotation process.

In a second embodiment of the injection molding machine according to the present invention, the injection molding machine further comprises: determination means for determining whether or not the resin passage is closed by the check ring based on a reverse rotational force applied to the screw which is detected by the rotational force detecting means during forward movement of the screw; reverse rotation amount adjusting means which carries out reverse rotation process iteratively in a molding cycle and increases a reverse rotation amount of the screw for each reverse rotation process until the determination means determines that the resin passage is closed; and reverse rotation amount determining means for setting a reverse rotation amount of the screw, at a time when closure of the resin passage is determined by the determination means, as the reverse rotation amount for the reverse rotation process.

The determination means may determine closure of the resin passage by the fact that a maximum value of the reverse rotational force applied to the screw detected during forward movement of the screw becomes a reference value or less.

The determination means may determine closure of the resin passage by the fact that an integrated value with respect to time, or an integrated value with respect to screw position, of the reverse rotational force which is applied to the screw and detected during forward movement of the screw, becomes a reference value or less.

Further, a first embodiment of a method for adjusting a reverse rotation amount of a reverse rotation process in the aforementioned injection molding machine includes a step of: rotating the screw in reverse by the rotary driving means while successively increasing a reverse rotation amount of the screw for each molding cycle during the interval from completion of the metering process until start of the injection process, and then moving the screw forward by the rotary driving means; detecting a reverse rotational force applied to the screw by the rotational force detecting means during forward movement of the screw; and determining whether or not the resin passage is closed by the check ring based on the detected reverse rotational force and setting a reverse rotation amount of the screw, at a time when closure of the resin passage is determined, as the reverse rotation amount for the reverse rotation process.

A second embodiment of a method for adjusting a reverse rotation amount of a reverse rotation process in the aforementioned injection molding machine includes a step of: performing operations for causing the rotary driving means to rotate the screw in reverse during the interval from completion of the metering process until start of the injection process and then causing the axial driving means to move the screw forward, while successively increasing a reverse rotation amount of the screw; detecting a reverse rotational force applied to the screw by the rotational force detecting means during forward movement of the screw; and determining whether or not the resin passage is closed by the check ring based on the detected reverse rotational force and setting a reverse rotation amount of the screw, at a time when closure of the resin passage is determined, as the reverse rotation amount for the reverse rotation process.

In the step of determining whether or not the resin passage is closed, closure of the resin passage may be determined when a maximum value of the reverse rotational force applied to the screw detected during forward movement of the screw becomes a reference value or less.

In the step of determining whether or not the resin passage is closed, closure of the resin passage may be determined when an integrated value with respect to time, or an integrated value with respect to screw position, of the reverse rotational force which is applied to the screw and detected during forward movement of the screw, becomes a reference value or less.

According to the present invention, since the screw reverse rotation amount of the screw reverse rotation process can be determined automatically and accurately, even when the resin and the mold are changed, or when molding conditions are varied, an optimal reverse rotation amount for the screw reverse rotation process can be obtained corresponding to the resin, the mold, and the molding conditions being used at that time. Because a reverse rotation amount for the screw, which allows the resin passage to close, can be accurately determined, injection can be initiated after closure of the resin passage, and the resin does not suffer from backflow, so that the resin amount that is filled in the mold is made uniform, and a stable molding process can be attained. Further, an increase of the molding cycle time and residing time of resin can be suppressed to a minimum.

BRIEF DESCRIPTION OF THE DRAWINGS

The above and other objects and features of the present invention will become more apparent from the following descriptions of preferred embodiments, taken in conjunction with the accompanying drawings. In the drawings.

DETAILED DESCRIPTION OF THE PREFERRED EMBODIMENTS

Figure 1:
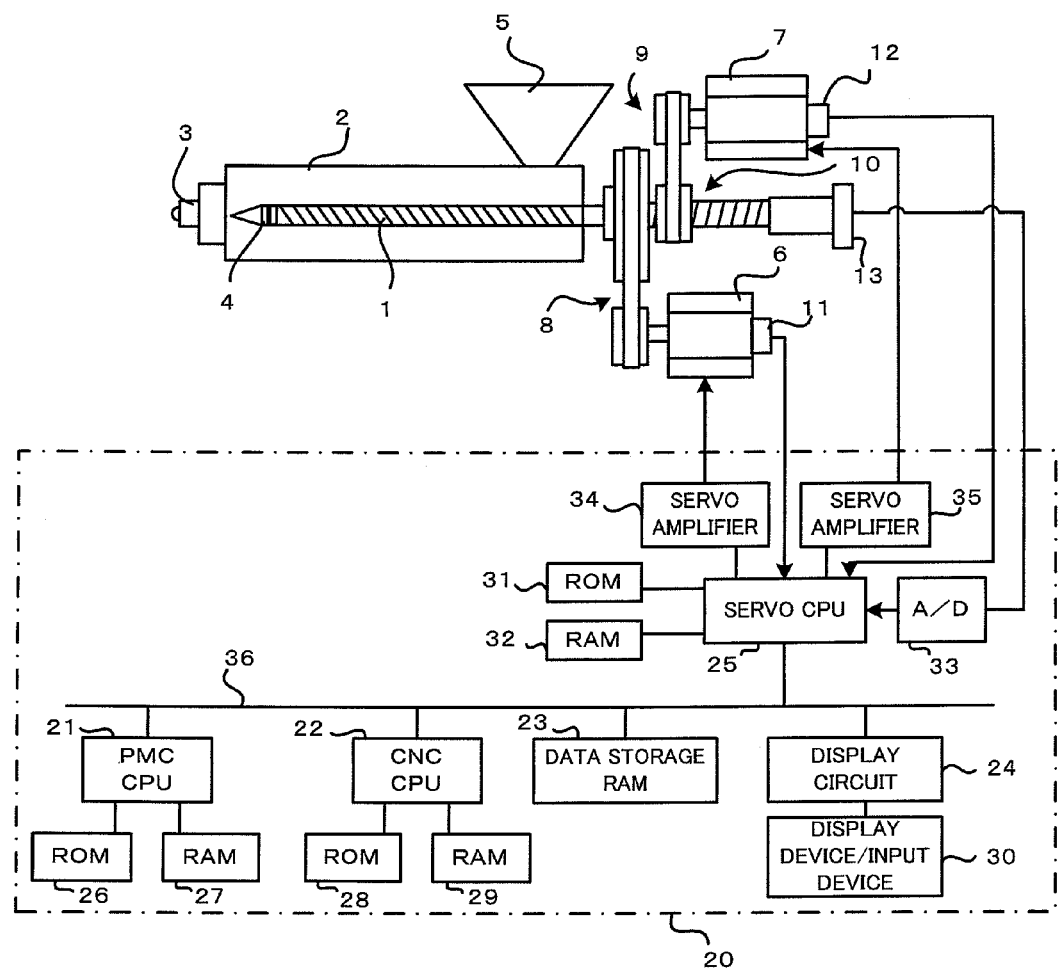
FIG. 1 is a schematic view of essential parts of an injection molding machine according to an embodiment of the present invention.

FIG. 1 is a block diagram of essential parts of an embodiment of the present invention.

A nozzle 3 is mounted on a front end of a cylinder 2 in which a screw 1 is inserted. A hopper 5 is assembled onto a rear end of the cylinder 2, through which a resin plate is supplied to the inside of the cylinder 2. On the front end of the screw 1, a check ring 4 is provided, which closes the resin passage by reverse rotation of the screw 1 (or by rotation in a direction reverse to the direction of screw rotation during metering) and which opens the resin passage by positive rotation of the screw at the time of measuring, as well as by the positive rotation and resin pressure. The screw 1 is rotatably driven by a screw-rotating servomotor 6 through a transmission mechanism 8. Furthermore, the screw 1 is driven in an axial direction by an injection servomotor 7 through a transmission mechanism 9 and a conversion mechanism 10, such as a ball screw/nut structure, which converts rotary motion into linear motion, so injection and back pressure control are carried out. Position/velocity detectors 11, 12 for detecting rotational position/velocity are mounted respectively on the screw-rotating servomotor 6 and the injection servomotor 7. The rotational velocity and rotation amount of the screw 1, the position of the screw 1 (the position in the axial direction of the screw), and the displacement velocity (injection velocity) are detected by the position/velocity detectors 11, 12. Further, pressure applied to the screw 1 from the molten resin in the axial direction of the screw is detected by a pressure sensor 13, such as a load cell or the like.

The controller 20 for controlling the injection molding machine includes a numerical control microprocessor CNC CPU 22, a programmable machine controller microprocessor PMC CPU 21, and a servo CPU 25 made up of a microprocessor for performing servo control, which are connected mutually to a CPU by bus 36.

A ROM 26 storing therein a sequencer program or the like for controlling an operation sequence of the injection molding machine, and a RAM 27 used for temporary storage of operation data, are connected to the PMC CPU 21. A ROM 28 storing therein an automated drive program or the like for controlling the injection molding machine in its entirety, and a RAM 29 used for temporary storage of operation data, are connected to the CNC CPU 22.

Further, a ROM 31 storing therein a control program for dedicated servo control, which carries out processing of a positional loop control, a velocity loop control and a current loop control, and a RAM 32 for temporary storage of data, are connected to the servo CPU 25. Moreover, a servo amplifier 34 for driving the screw-rotating servomotor 6, and a servo amplifier 35 for driving the injection servomotor 7, which drives the screw 1 in the axial direction to carry out injection, etc., based on commands from the SERVO CPU 25, are connected to the SERVO CPU 25. Outputs from the position/velocity detectors 11, 12 disposed respectively on the servomotors 6, 7 are fed back to the SERVO CPU 25. The SERVO CPU 25 performs position/velocity feedback control based on movement commands to the respective axes (including screw-rotating servomotor 6 and injection servomotor 7) as commanded from the CNC CPU 22, and the detected position/velocity feedback from the position/velocity detectors 11, 12, and also performs current feedback control, thereby controlling driving of each of the servomotors 6, 7 through the respective servo amplifiers 34, 35.

Further, the resin pressure (resin pressure applied to the screw 1), obtained by converting a detection signal of the pressure sensor 13 into a digital signal by an A/D converter (a converter for converting analog signals to digital signals) 33, is input to the servo CPU 25. In addition, a widely known disturbance estimation observer is incorporated in the drive control of the screw-rotating servomotor 6 so as to detect the rotational force generated by resin backflow, which causes the screw 1 to rotate. A force in the rotational direction (rotational force) applied to the screw 1 is detected by the disturbance estimation observer.

Servomotors and servo amps for driving a mold clamping mechanism and an ejector mechanism, etc., are also provided in the injection molding machine. However, because such elements are not directly related to the subject matter of the present invention, these features have been omitted from FIG. 1.

An input device 30 equipped with a display device constituting a liquid crystal or CRT display is connected to the bus 36 through a display circuit 24. Further, a data storage RAM 23 made up of a nonvolatile memory also is connected to the bus 36. The data storage RAM 23 stores molding conditions and various settings, parameters, macro variables, etc., concerning injection molding operations.

By the above structure, a so-called digital servo process is executed, in which the PMC CPU 21 controls sequence operations for the injection molding machine in its entirety, the CNC CPU 22 carries out distribution of movement commands to the servomotors of respective axes based on drive programs in the ROM 28 and molding conditions and the like, which are stored in the data storage RAM 23, and the servo CPU 25 carries out servo controls, made up of a position loop control, a velocity loop control, and a current loop control, etc., in the same manner as the prior art, based on movement commands distributed to respective axes (servomotors for respective drive axes, such as screw-rotating servomotor 6 and injection servomotor 7), and on position and velocity feedback signals detected by the position/velocity detectors.

The aforementioned structure does not differ from the controller of a conventional electric injection molding apparatus. The controller 20 of FIG. 1 differs from the conventional controller in that an adjustment function is added, for adjusting a screw reverse rotation amount in the screw reverse rotation process.

When the screw 1 is advanced in a state in which the check ring 4 does not close the resin passage, the molten resin flows backward from the front (nozzle 3 side) toward the rear end (hopper 5 side) of the check ring 4. The resin pressure is applied to the flight of the screw 1 by the back-flowing resin, so a rotational force that causes the screw 1 to rotate is applied as a load to the screw 1. The rotational force also is applied as a load to the screw-rotating servomotor 6 that drives the screw 1. According to the present embodiment, this rotational force is detected by the known disturbance estimation observer which is incorporated in the drive controlling of the screw-rotating servomotor 6. Moreover, the rotational force may also be detected, in place of the disturbance estimation observer, by a drive current of the screw-rotating servomotor 6, or a strain sensor or the like may be provided on the screw 1 or on the transmission mechanism 8 that transmits rotational force to the screw 1.

Figure 2:
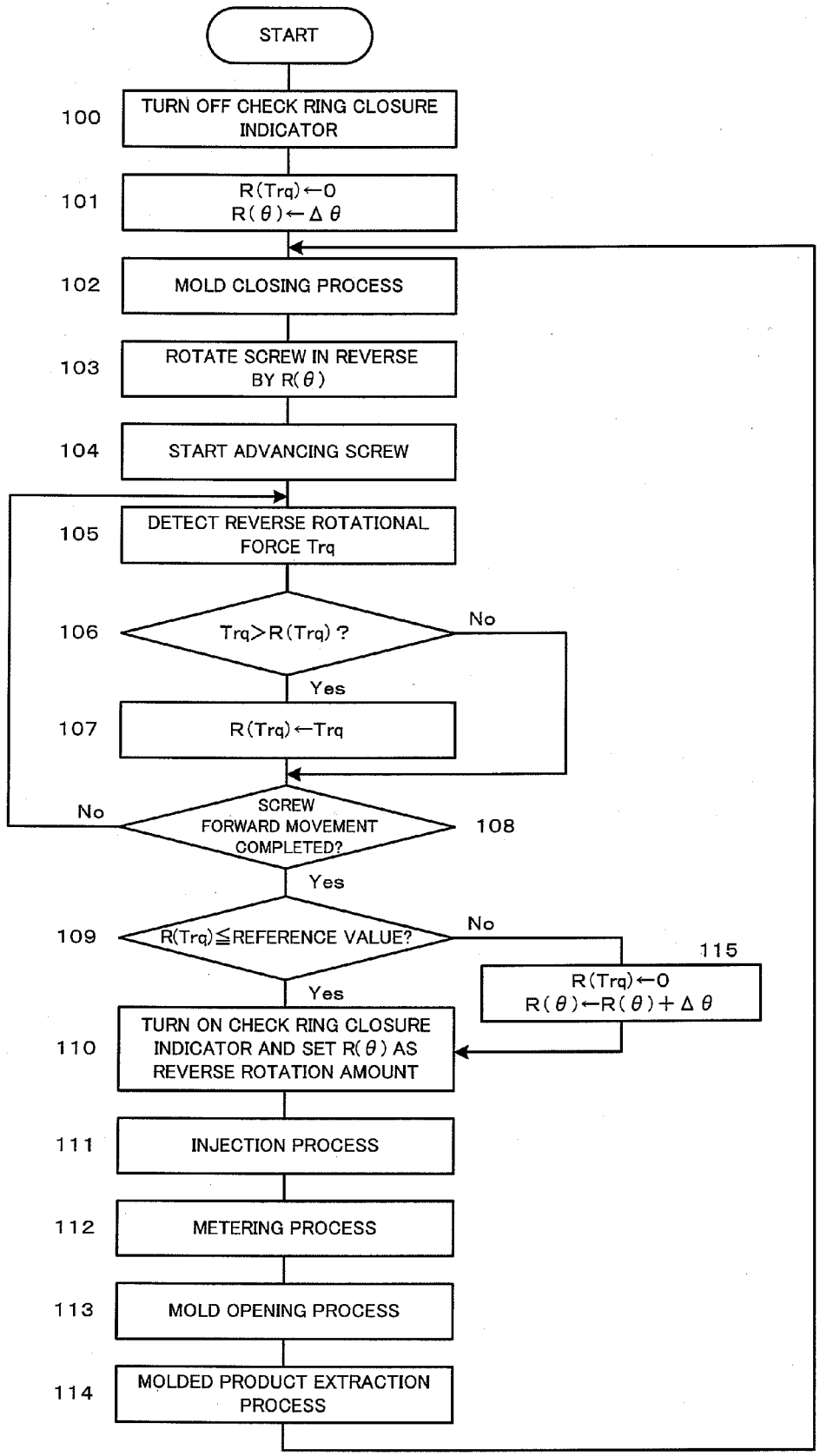
FIG. 2 is a flowchart illustrating an algorithm of a molding process, including a process for adjusting a reverse rotation amount of a screw, which is executed by a PMC CPU of the controller of FIG. 1.

FIG. 2 is a flowchart illustrating an algorithm of a molding process, including a process for adjusting a reverse rotation amount of an injection screw, which is executed by the PMC CPU 21 of the controller 20 according to the first embodiment of the present invention.

In the first embodiment, after completion of metering and before injection is started, the screw is rotated in reverse, and thereafter, the screw is moved forward and the reverse rotational force applied to the screw 1 is metered. Closure of the resin passage by the check ring 4 is detected in accordance with lowering of the reverse rotational force. The reverse rotation amount at the time that closure of the resin passage is detected is then detected as reverse rotation amount required for the check ring 4 to close the resin passage. For this purpose, a single-increment rotation amount $\Delta\theta$ by which the reverse rotation amount of the screw is increased sequentially and a reference value (threshold value) to be used for detecting the lowering of the reverse rotational force are set in advance.

When an automated adjustment command for the screw reverse rotation amount is input, the PMC CPU 21 initiates the process of FIG. 2.

First, a check ring closure indicator, which is disposed on the display screen of the display device-equipped input device 30, is turned off (step 100), the register R(Trq) that stores the measured screw reverse rotation amount Trq is reset to "0", and the single-increment rotation amount Δθ, which is set in the register R(θ) that stores the reverse rotation amount of the screw 1, is set (step 101). In addition, the mold closing process is executed (step 102), and thereafter, the screw-rotating servomotor 6 is driven to rotate the screw 1 in reverse by the angle set in the register R(θ) (step 103). It should be noted that the aforementioned processing is initiated under a state in which the resin has been melted and kneaded with a metering process executed beforehand.

Next, the injection servomotor 7 is driven and a screw advancing operation for advancing the screw (in the injection direction) by a predetermined forward distance is initiated (step 104). During forward movement of the screw 1, the reverse rotational force Trq of the screw 1, which is measured by the disturbance estimation observer incorporated in the drive controlling of the screw-rotating servomotor 6, is obtained (step 105). The reverse rotational force Trq obtained in this manner is compared with the reverse rotational force (which at first is set to 0 in step 101) stored in the register R(Trq) (step 106), and only when the obtained reverse rotational force Trq is greater than the reverse rotational force stored in the register R(Trq), the determined reverse rotational torque Trq is stored in the register R(Trq) (step 107). In addition, it is judged whether or not the screw 1 has moved the predetermined forward distance and reached the screw forward movement position (step 108). If not reached yet, the process returns to step 105, and the processing in steps 105 to 108 are executed for each sampling cycle. As a result, at a point of time when forward movement of the screw 1 is completed, the maximum reverse rotational force applied during forward movement of the screw 1 is stored in the register R(Trq).

When forward movement of the screw 1 is completed, a judgment is made whether or not the maximum reverse rotational force, which is stored in the register R(Trq), is at or below the set reference value (step 109).

The check ring 4 closes the resin passage by reverse rotation of the screw 1. When the reverse rotation amount is not small enough, the resin passage remains in an open state. If the resin passage is not closed, as described above, a reverse flow of the resin is generated when the screw 1 moves forward. A reverse rotational force load is imposed on the screw 1, as a result of the reverse flow of the resin. This load is determined by the disturbance estimation observer. Accordingly, under a condition in which the reverse rotation amount of the screw 1 is insufficient and the resin passage is not closed, the maximum reverse rotational force stored in the register R(Trq) does not become equal to or lower than the reference value. In this case, the process proceeds from step 109 to step 115, the register R(Trq) is cleared to "0", and the reverse rotation amount stored in the register R(θ) is increased by the single-increment amount Δθ.

Additionally, in the same manner as the conventional art, an injection process (step 111), a metering process (step 112), a mold opening process (step 113) and a molded product extraction process (step 114) are carried out, whereupon the process returns to step 102. Thereafter, the processing in steps 102 to 109, step 115, and steps 111 to 114 are executed, so long as it is not judged that the maximum rotational force stored in the register R(Trq) is equal to or less than the reference value. In this case, the reverse rotation amount at which the screw 1 is rotated in reverse, executed by step 104, is increased sequentially by the single-increment amount Δθ in step 115.

When the screw 1 is rotated in reverse sufficiently to close the resin passage by the check ring 4, the resin passage is closed and backflow of the resin stops, and the load generated by resin backflow that causes the screw 1 to rotate in reverse also ceases to occur. As a result, the maximum reverse rotational force stored in the register R(Trq) in step 109 is detected as having become at or below the reference value. At this time, the check ring closure indicator is turned on, and the reverse rotation amount stored in the register R(θ) is set, within the molding conditions, as the screw reverse rotation amount for the purpose of closing the resin passage by the check ring. Further, the screw reverse rotation amount is displayed as the reverse rotation amount for the screw reverse rotation process on the display screen of the display-equipped input device 30.

Thus, after the screw reverse rotation amount for closing the resin passage by the check ring has been set and the check ring closure indicator is turned on, usual molding operations as performed in the conventional art are carried out. More specifically, the processing in steps 100, 101, 104 to 110, and 115 in FIG. 2 are not executed, but series of processing of the mold closing process→reverse rotation of the screw in accordance with the set reverse rotation amount→the injection process→the metering process→the mold opening process→and the molded product extraction process are executed repeatedly.

In the first embodiment discussed above, closure of the resin passage by the check ring is determined by a maximum value of the reverse rotational force of the screw generated during forward movement of the screw. However, in place of the maximum value of the reverse rotational force of the screw, an integrated value with respect to time, or an integrated value with respect to screw position, of the reverse rotational force may be obtained, whereby closure of the resin passage may be determined by this integrated value.

In the event that an integrated value with respect to time or screw position is used for the above determination, a register A(t) or A(x) which integrates the measured torque Trq with respect to time or screw position is provided, in place of the register R(Trq) storing the maximum value of the measured torque Trq, and in steps 101 and 115, the register A(t) or A(x) is reset to "0", instead of the register R(Trq). Also, when using integrated value with respect to time, instead of the processing in steps 106 and 107, a value obtained by multiplying the sampling period δt by the measured torque Trq is added to the value stored in the register A(t) to obtain the integrated value of the measured torque Trq. When using integrated value with respect to screw position, a movement amount δx for each sampling period is determined, and a value obtained by multiplying the movement amount δx of the sampling period by the measured torque Trq is added to the register A(x) to obtain the integrated value of the measured torque Trq with respect to screw position.

Further, in the first embodiment described above, the screw is moved forward by a predetermined movement distance. However, in place of such a predetermined movement distance, the screw may be moved forward for a predetermined time instead.

Figure 3:
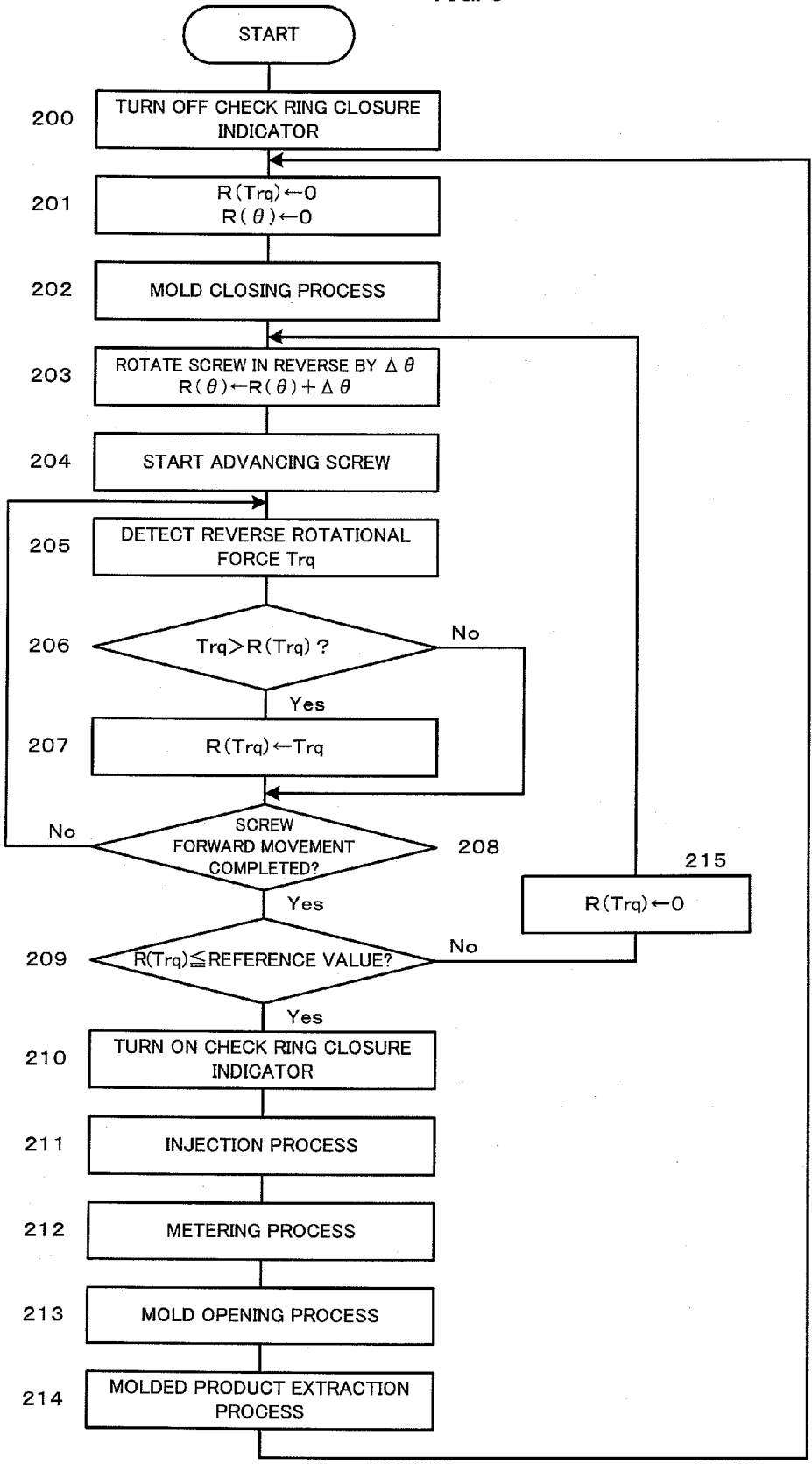
FIG. 3 is a flowchart illustrating an algorithm of a molding process, including a process for adjusting a reverse rotation amount of a screw, which is executed by a PMC CPU of the controller of FIG. 1.

FIG. 3 is a flowchart illustrating an algorithm of a molding process, including a process for adjusting a reverse rotation amount of a injection screw, which is executed by the PMC CPU 21 of the controller 20 according to a second embodiment of the present invention.

In the second embodiment, during the first molding cycle operation, closure of the resin passage by the check ring is detected while the reverse rotation amount is increased sequentially by a predetermined amount, and injection is carried out. First, in the same manner as the first embodiment, a single-increment rotation amount Δθ for sequentially increasing the reverse rotation amount of the screw, and a reference value for detecting lowering of reverse rotational force, are set in advance.

When an automated adjustment command for the screw reverse rotation amount is input, the PMC CPU 21 initiates the process of FIG. 3.

First, a check ring closure indicator, which is disposed on the display screen of the display device-equipped input device 30, is turned off (step 200), the register R(Trq) that stores the measured screw reverse rotation amount Trq, and the register R(θ) that stores the reverse rotation amount of the screw 1, are reset to "0" (step 201). In addition, the mold closing process is executed (step 202), and thereafter, the screw-rotating servomotor 6 is driven and the screw 1 is rotated in reverse only one time by the set rotation amount Δθ, and the reverse rotation amount Δθ is added to the register R(θ) (step 203).

It should be noted that, in the same manner as the first embodiment, a metering process is executed beforehand, and the aforementioned processing is initiated under a state in which the resin has been melted and kneaded.

Next, the injection servomotor 7 is driven and a screw advancing operation for moving the screw forward (in the injection direction) by a predetermined forward distance is initiated (step 204). During forward movement of the screw 1, the reverse rotational force Trq of the screw 1, which is measured by the disturbance estimation observer incorporated in the drive control process of the screw-rotating servomotor 6, is obtained (step 205). The obtained reverse rotational force Trq is compared with the reverse rotational force (which at first is set to 0 in step 201) stored in the register R(Trq) (step 206), and only when the obtained reverse rotational force Trq is greater than the reverse rotational force stored in the register R(Trq), the obtained reverse rotational torque Trq is stored in the register R(Trq) (step 207). In addition, it is judged whether or not the screw 1 has moved the predetermined forward distance and reached the screw forward movement position (step 208). If not reached yet, the process returns to step 205, and the processing in steps 205 to 208 are executed for each sampling cycle. As a result, at a point of time when forward movement of the screw 1 is completed, the maximum reverse rotational force applied during forward movement of the screw 1 is stored in the register R(Trq).

When forward movement of the screw 1 is completed, a judgment is made whether or not the maximum reverse rotational force, which is stored in the register R(Trq), is at or below the set reference value (step 209).

As mentioned above, at a state in which the reverse rotation amount of the screw 1 is insufficient and the resin passage is not closed, the maximum reverse rotational force stored in the register R(Trq) does not become equal to or less than the reference value. In this case, the process proceeds from step 209 to step 215, the register R(Trq) is cleared to "0", and the process returns to step 203. Henceforth, the processing in steps 203 to 209→step 215→step 203 are executed repeatedly, until the maximum reverse rotational force stored in the register R(Trq) is judged to be at or below the reference value in step 209. Specifically, the reverse rotation amount of the screw is increased each time by Δθ, while the operation of advancing the screw 1 is executed repeatedly.

When the screw 1 is rotated in reverse sufficient to close the resin passage of the check ring 4, the resin passage is closed and the load that causes reverse rotation of the screw 1, which is generated by resin backflow, ceases to occur. Therefore, the maximum reverse force stored in the register R(Trq) at step 209 is detected as having become at or below the reference value. When closure of the resin passage by the check ring 4 is detected in this way, the check ring closure indicator is turned on, and further, the screw reverse rotation amount stored in the register R(θ) is displayed as the reverse rotation amount for the screw reverse rotation process on the display screen of the display-equipped input device 30 (step 210). Thereafter, the injection process (step 211), the metering process (step 212), the mold opening process (step 213) and the molded product extraction process (step 214) are executed, and one molding cycle is completed. Then process returns to step 201 and the next molding cycle is initiated.

In the second embodiment, as described above, closure of the resin passage by the check ring 4 is confirmed for each molding cycle, and then injection is carried out. Further, in the second embodiment as well, closure of the resin passage is confirmed, and when the screw reverse rotation amount at that time is obtained, the reverse rotation amount thus obtained is set as the reverse rotation amount for the reverse rotational movement process of the screw. Thereafter, each of the operational processes of the molding cycle may be executed as in the conventional art. More specifically, when it is detected in step 209 that the maximum reverse rotational force stored in the register R(Trq) has become equal to or less than the reference value, the check ring closure indicator is turned on in step 210, and the screw reverse rotation amount stored in the register R(θ) is set as the reverse rotation amount for the screw reverse rotational movement process. Then, the processing in steps 211 to 214 are performed, and after one molding cycle has been completed, the system switches to an ordinary molding operation, such that in the molding operation thereafter, molding cycles may be executed, which are made up of the mold closing process→the screw reverse rotation process by the set reverse rotation amount→the injection process→the metering process→the mold opening process→and the molded product extraction process.

Moreover, in the second embodiment as well, as discussed previously, an integrated value with respect to time, or an integrated value with respect to screw position, of the reverse rotational force may be obtained to determine closure of the resin passage by using the obtained integrated value, in place of determining closure of the resin passage by the check ring on the basis of the maximum value of the reverse rotational force of the screw. Further, the screw may also be moved forward for a predetermined time, instead of being moved forward by predetermined movement distance in step 204.

The invention claimed is:

1. A method for adjusting a reverse rotation amount of a reverse rotation process in an injection molding machine which comprises an injection screw having a check ring thereon for closing a resin passage by reverse rotating the screw in a direction reverse to rotation of the screw during metering, rotary driving means for rotationally driving the screw, axial driving means for driving the screw in an axial direction of the screw, and rotational force detecting means for detecting a rotational force acting on the screw, and carries out a reverse rotation process in which, during an interval after completion of a metering process until start of an injection process, the screw is caused to rotate in a direction opposite to that during metering process, the method comprising the steps of:
rotating the screw in reverse by said rotary driving means during the interval from completion of the metering process until start of the injection process, and then moving the screw forward by said rotary driving means;
detecting a reverse rotational force applied to the screw by said rotational force detecting means during forward movement of the screw;

determining whether or not the resin passage is closed by said check ring based on the detected reverse rotational force for each molding cycle;

increasing the reverse rotation amount of the screw for each molding cycle until said determination means determines that the resin passage is closed; and stopping an increment of the reverse rotation when the resin passage is determined to be closed, and setting the current reverse rotation amount as a setting value of the reverse rotation process.

2. The method according to claim 1, wherein, in the step of determining whether or not the resin passage is closed, closure of the resin passage is determined when a maximum value of the reverse rotational force applied by resin backflow to the screw, as detected by the rotational force detecting means, during forward movement of the screw becomes a reference value or less.

3. The method according to claim 1, wherein, in the step of determining whether or not the resin passage is closed, closure of the resin passage is determined when an integrated value with respect to time, or an integrated value with respect to screw position, of the reverse rotational force, which is applied by resin backflow to the screw and is detected by the rotational force detecting means during forward movement of the screw, becomes a reference value or less.

4. A method for adjusting a reverse rotation amount of a reverse rotation process in an injection molding machine which comprises an injection screw having a check ring thereon for closing a resin passage by reverse rotating the screw in a direction reverse to rotation of the screw during metering, rotary driving means for rotationally driving the screw, axial driving means for driving the screw in an axial direction of the screw, and rotational force detecting means for detecting a rotational force acting on the screw, and carries out a reverse rotation process in which, during an interval after completion of a metering process until start of an injection process, the screw is caused to rotate in a direction opposite to that during metering process, the method comprising the steps of:

performing the reverse rotational process by said rotary driving means to rotate the screw in reverse during the interval from completion of the metering process until start of the injection process and the screw forward process by said axial driving means to move the screw forward;

detecting a reverse rotational force applied to the screw by said rotational force detecting means during forward movement of the screw;

determining whether or not the resin passage is closed by said check ring based on the detected reverse rotational force;

carrying out said reverse rotation process and screw forward process and increasing the reverse rotation amount of the screw for each screw reverse rotation process, iteratively in a molding cycle, until said determination means determines that the resin passage is closed; and stopping an increment of the reverse rotation when the resin passage is determined to be closed, and setting the current reverse rotation amount as a setting value of the reverse rotation process and go on to next cycle operation.

5. The method according to claim 4, wherein, in the step of determining whether or not the resin passage is closed, closure of the resin passage is determined when a maximum value of the reverse rotational force applied by resin backflow to the screw, as detected by the rotational force detecting means, during forward movement of the screw becomes a reference value or less.

6. The method according to claim 4, wherein, in the step of determining whether or not the resin passage is closed, closure of the resin passage is determined when an integrated value with respect to time, or an integrated value with respect to screw position, of the reverse rotational force, which is applied by resin backflow to the screw and is detected by the rotational force detecting means during forward movement of the screw, becomes a reference value or less.

7. An injection molding machine, comprising:

an injection screw having a check ring thereon for closing a resin passage by reverse rotating the screw in a direction reverse to rotation of the screw during metering;

rotary driving means for rotationally driving the screw;

axial driving means for driving the screw in an axial direction of the screw; and rotational force detecting means for detecting a rotational force acting on the screw;

wherein said machine is adapted to carry out a reverse rotation process in which, during an interval after completion of a metering process until start of an injection process, the screw is caused to rotate in a direction opposite to that during the metering process;

said injection molding machine further comprising:

determination means for determining whether or not the resin passage is closed by said check ring based on a reverse rotational force applied to the screw which is detected by said rotational force detecting means during forward movement of the screw;

reverse rotation amount adjusting means for increasing a reversed rotation amount of the screw for each molding cycle until said determination means determines that the resin passage is closed; and reverse rotation amount determining means for setting a reverse rotation amount of the screw, at a time when closure of the resin passage is determined by said determination means, as the reverse rotation amount for the reverse rotation process.

8. The injection molding machine according to claim 7, wherein said determination means determines closure of the resin passage by the fact that a maximum value of the reverse rotational force applied by resin backflow to the screw, as detected by the rotational force detecting means, during forward movement of the screw becomes a reference value or less.

9. The injection molding machine according to claim 7, wherein the determination means determines closure of the resin passage by the fact that an integrated value with respect to time, or an integrated value with respect to screw position, of the reverse rotational force, which is applied by resin backflow to the screw and is detected by the rotational force detecting means during forward movement of the screw, becomes a reference value or less.

10. An injection molding machine, comprising:

an injection screw having a check ring thereon for closing a resin passage by reverse rotating the screw in a direction reverse to rotation of the screw during metering;

rotary driving means for rotationally driving the screw;

axial driving means for driving the screw in an axial direction of the screw; and rotational force detecting means for detecting a rotational force acting on the screw;

wherein said machine is adapted to carry out a reverse rotation process in which, during an interval after completion of a metering process until start of an injection process, the screw is caused to rotate in a direction opposite to that during the metering process;

said injection molding machine further comprising:

determination means for determining whether or not the resin passage is closed by said check ring based on a reverse rotational force applied to the screw which is detected by said rotational force detecting means during forward movement of the screw;

reverse rotation amount adjusting means for carrying out the reverse rotation process iteratively in a molding cycle and for increasing a reverse rotation amount of the screw for each reverse rotation process until said determination means determines that the resin passage is closed; and reverse rotation amount determining means for setting a reverse rotation amount of the screw, at a time when closure of the resin passage is determined by said determination means, as the reverse rotation amount for the reverse rotation process.

11. The injection molding machine according to claim 10, wherein said determination means determines closure of the resin passage by the fact that a maximum value of the reverse rotational force applied by resin backflow to the screw, as detected by the rotational force detecting means, during forward movement of the screw becomes a reference value or less.

12. The injection molding machine according to claim 10, wherein the determination means determines closure of the resin passage by the fact that an integrated value with respect to time, or an integrated value with respect to screw position, of the reverse rotational force, which is applied by resin backflow to the screw and is detected by the rotational force detecting means during forward movement of the screw, becomes a reference value or less.

* * * * *